Patented July 16, 1929.

1,720,808

UNITED STATES PATENT OFFICE.

DON O. WALDEN, OF FREMONT, OHIO, ASSIGNOR TO NATIONAL CARBON COMPANY, INCORPORATED.

PRIMARY CELL.

No Drawing. Application filed June 16, 1925. Serial No. 37,557.

This invention relates to primary cells with alkaline electrolyte, and particularly to that type employing copper oxid and zinc as the electrodes.

The invention has for its principal object the prevention of non-uniform consumption of the zinc electrode during the operation of the cell. According to the preferred method of practicing the invention, this is accomplished by forming on the zinc plate a coating of a material soluble in alkaline electrolyte but adapted to protect the plate from foreign matter with which it may come in contact, and particularly from oil or other insulating compounds either before or during its introduction into the cell.

It is common practice in using cells with alkaline electrolyte to provide a layer of oil on the caustic solution to prevent evaporation and contamination. The oil for this purpose may conveniently be applied to the dry caustic, from which it rises to the surface of the liquid when water is added to form the electrolyte; but when this practice is followed I have found an increased tendency toward non-uniform consumption of the zinc, especially when impure water, such as ordinary hard water, is used in making up the electrolyte. I ascribe this increased tendency to non-uniform zinc consumption under the above described conditions to the formation of small bodies of insoluble soap from saponifiable matter in the oil and impurities in the water, which bodies attach themselves to the zinc, thereby excluding the electrolyte from contact therewith, with the result that the zinc is attacked on a portion only of its surface. Whatever the true explanation of the non-uniform consumption of the zinc may be, it is largely avoided by the procedure now to be described.

According to the preferred method of carrying out the present invention the zinc plates are dipped in a dilute sodium silicate solution and allowed to dry. The plates then may be assembled with the copper oxid electrode and, together with dry caustic soda, placed in a suitable container. Water is then added in amount sufficient to insure a caustic alkali solution of the desired dilution. Alternatively, the electrode assembly may be introduced into the container after the electrolyte is prepared. In either event, the silicate coating will serve to protect the zinc plates until the oil and saponifiable or other deleterious substances contained therein have risen to the surface of the solution.

While the invention has been described with particular reference to the use of sodium silicate as the protecting coating material, other materials which dissolve in a caustic alkali solution in a reasonably short time and do not seriously affect the service characteristics of the cell may be used. Examples of such coating materials are varnish, lacquer, gelatine or starch.

Some of the advantages of the invention may be obtained by applying a coating to the plate which can be removed bodily therefrom, such as, for example, a coating of paper. Further, the invention is not limited to the protection of zinc electrodes since other metallic electrodes used in alkaline cells may be similarly protected.

The improved results obtained by the present invention are not dependent upon the specific procedure described, and various modifications thereof may be made within the scope of the present claims.

I claim:

1. In a galvanic cell, a mixture of dry caustic alkali and oil, and a zinc electrode coated with a material adapted to prevent oily particles in the caustic from adhering to the zinc electrode either before or while the cell is being prepared for use.

2. A galvanic cell comprising a zinc electrode, an alkaline electrolyte, and oil, said electrode being separated from the electrolyte and oil by a fugitive electrode coating adapted to be destroyed on open circuit.

3. A galvanic cell comprising a zinc electrode, an alkaline electrolyte, and oil, said electrode being provided with a fugitive coating containing sodium silicate.

In testimony whereof, I affix my signature.

DON O. WALDEN.